US007251934B2

(12) United States Patent
Lech et al.

(10) Patent No.: US 7,251,934 B2
(45) Date of Patent: Aug. 7, 2007

(54) WORK VEHICLE HYDRAULIC SYSTEM

(75) Inventors: Richard J. Lech, Burlington, IA (US); Matthew J. Hennemann, Burlington, IA (US)

(73) Assignee: CNH America LLC, New Holland, PA (US)

( * ) Notice: Subject to any disclaimer, the term of this patent is extended or adjusted under 35 U.S.C. 154(b) by 165 days.

(21) Appl. No.: 10/811,042

(22) Filed: Mar. 27, 2004

(65) Prior Publication Data

US 2005/0210871 A1 Sep. 29, 2005

(51) Int. Cl.
*F16D 31/02* (2006.01)

(52) U.S. Cl. .......................................................... 60/430

(58) Field of Classification Search .................. 60/430; 91/516

See application file for complete search history.

(56) References Cited

U.S. PATENT DOCUMENTS

| | | | | |
|---|---|---|---|---|
| 3,760,689 | A * | 9/1973 | Johnston | 60/421 |
| 4,024,710 | A | 5/1977 | Zelle | |
| 4,044,786 | A | 8/1977 | Yip | |
| 4,214,446 | A | 7/1980 | Bettin | |
| 4,308,787 | A | 1/1982 | Parquet et al. | |
| 4,449,365 | A | 5/1984 | Hancock | |
| 4,454,715 | A | 6/1984 | Muller et al. | |
| 4,470,260 | A | 9/1984 | Miller et al. | |
| 4,479,349 | A | 10/1984 | Westveer | |
| 4,508,013 | A | 4/1985 | Barbagli | |
| 4,809,586 | A | 3/1989 | Gage et al. | |
| 4,898,078 | A | 2/1990 | Gage et al. | |
| 5,179,835 | A * | 1/1993 | Casey et al. | 91/516 |
| 5,333,449 | A | 8/1994 | Takahashi et al. | |
| 5,413,452 | A * | 5/1995 | Lech et al. | 91/516 |
| 5,471,908 | A * | 12/1995 | Lech | 91/516 |
| 5,505,275 | A | 4/1996 | Phillips | |
| 5,617,724 | A | 4/1997 | Ko | |
| 5,722,190 | A | 3/1998 | Arnold | |
| 5,832,729 | A | 11/1998 | Reid et al. | |
| 5,896,943 | A | 4/1999 | Christensen | |
| 6,029,445 | A | 2/2000 | Lech | |
| 6,205,781 | B1 | 3/2001 | A'Hearn | |
| 6,321,535 | B2 | 11/2001 | Ikari et al. | |
| 6,658,843 | B1 | 12/2003 | Kauss | |
| 2001/0008068 | A1 | 7/2001 | Ikari et al. | |
| 2003/0097837 | A1 | 5/2003 | Hiraki et al. | |

* cited by examiner

*Primary Examiner*—F. Daniel Lopez
(74) *Attorney, Agent, or Firm*—John William Stader; Michael G. Harms

(57) ABSTRACT

A hybrid hydraulic system for a work vehicle is provided that includes a first fixed displacement hydraulic pump whose outlet is connected to a priority valve. The priority valve, in turn, directs the pump's flow to a first group of closed center backhoe valves on a primary circuit and a second group of open center loader valves on a secondary circuit. A second hydraulic pump is provided with independent load sensing capability to supplement fluid flow provided by the first pump.

8 Claims, 2 Drawing Sheets

WORK VEHICLE HYDRAULIC SYSTEM

FIELD OF THE INVENTION

This invention relates generally to off-road work vehicles. In particular, it relates to hydraulic systems for work vehicles such as loader-backhoes. Even more particularly it relates to devices and methods for loading and unloading the hydraulic circuits of those vehicles.

BACKGROUND OF THE INVENTION

Off-highway work vehicles such as loader-backhoes utilize a variety of hydraulic system architectures. One common arrangement is called an "open center" architecture. In a typically open center systems, a constant displacement pump such as a simple gear pump is used as a primary source of hydraulic fluid for the various hydraulic devices in the system. The pump provides a constant flow rate of hydraulic fluid through the system that does not vary with time. The control valves function by restricting this hydraulic fluid flow through the pump and providing an alternative path into the actuator to be moved. The pump responsively raises the pressure in its outlet line (i.e. the main hydraulic supply line) sufficient to maintain a constant flow rate through the pump. In an open center system, generally speaking, the flow rate through the pump is constant and the load on the pump and engine varies with changing head pressure.

In another common arrangement, called a "closed center" architecture, a variable displacement pump (such as a destroking piston pump) is provided that is configured to maintain a relatively constant output pressure regardless of the flow rate over time. The various control valves function by connecting the devices they control to the output of the pump. When the control valves provide this alternative flow path, the output pressure tends to drop and the control circuit for the pump compensates by increasing the specific displacement of the pump. When the specific displacement is increased, the pressure is restored to its design output pressure. When the operator closes the valve that conducts fluid to the desired device, the pressure increases in the system and the control circuitry for the hydraulic pump responsively reduces the specific displacement of the pump (i.e. the pump is "destroked"). In a closed center system, generally speaking, the pressure provided by the pump is constant and the flow rate is varied as necessary to maintain a constant head pressure.

Some systems are hybrids of both open center and closed center components. In these systems, some control valves are configured to operate as open center valves and some control valves are configured to operate as closed center valves. In these hybrid systems, the pump is an open center (i.e. constant displacement) pump. This mandates that one modify the closed center valves for use in an otherwise open center system. The closed center valves must be coupled to the hydraulic supply at a point downstream from the open center components in order to operate properly.

The modifications in hybrid systems include an inlet compensator at the inlet of the closed center valves that directs hydraulic fluid either to the closed center function when the closed center valves are selected, or directs it to the tank when the open center valves are used. The inlet compensator requires a constant pressure differential be established to work correctly but increases average working pressure, higher neutral standby pressures, more component complexity/cost to make the system perform correctly, increased fuel consumption, etc.

What is needed is a system for directing fluid flow to both open center and closed center components that reduces the losses in current subsystems. What is also needed is a system that eliminates the need for an inlet compensator. It is an object of this invention to provide such a system.

SUMMARY OF THE INVENTION

In accordance with a first embodiment of the invention, a hydraulic system for a work vehicle is provided having a first hydraulic pump configured to generate a flow of hydraulic fluid; a priority valve in fluid communication with the pump, the priority valve being configured to distribute the flow to a first outlet and to a second outlet; a plurality of open center hydraulic valves coupled to the first outlet; and a plurality of closed center hydraulic valves coupled to the second outlet.

The first hydraulic pump may be a fixed displacement gear pump, and the priority valve may be responsive to a load on the plurality of closed center valves. The plurality of closed center valves may include at least one valve selected from the group including a boom swing actuator control valve, a boom cylinder control valve, a dipper cylinder control valve, and a bucket cylinder control valve. The plurality of open center valves may include at least one valve selected from the group including a loader bucket cylinder valve and a loader arm cylinder valve. The system may further include a second hydraulic pump coupled to and driving the plurality of closed center hydraulic valves. The second pump may be responsive to some loads that control the priority valve and independent of other loads that control the priority valve. There may be no inlet compensator in fluid communication with and disposed between the plurality of closed center hydraulic valves and the first pump. The system may also include a second fixed displacement hydraulic pump disposed to provide the plurality of closed center valves with hydraulic fluid. The system may further include a reloader valve coupled to and between the second hydraulic pump and the plurality of closed center valves, and the rebader valve may be responsive to a load signal on a load signal line coupled to the plurality of closed center valves.

In accordance with a second embodiment of the invention, a hydraulic system for a work vehicle is provided that includes an engine; a first hydraulic pump driven by the engine and configured to generate a flow of hydraulic fluid; a priority valve in fluid communication with the pump, the priority valve being configured to distribute the flow to a priority outlet and to a secondary outlet; a plurality of open center hydraulic valves coupled to one of the priority and secondary outlets; a plurality of closed center hydraulic valves coupled to another of the primary and secondary outlets; and a second pump driven by the engine and configured to provide hydraulic fluid to the plurality of closed center valves.

The first and second hydraulic pumps may be fixed displacement gear pumps. The plurality of closed center valves may include at least one valve selected from the group comprising a boom swing actuator control valve, a boom actuator control valve, a dipper actuator control valve, and a bucket actuator control valve. The plurality of open center valves may include at least one valve selected from the group comprising a loader bucket actuator valve and a loader arm actuator valve. The second hydraulic pump may be coupled to and may drive the plurality of closed center hydraulic valves. The second hydraulic pump may be configured to be responsive to at least one load that controls the priority valve. The second hydraulic pump may be configured to be independent of at least one load that controls the priority valve. The system may have no inlet compensator in fluid communication with and disposed between the plurality of closed center hydraulic valves and the first pump. The system may also include a reloader valve coupled to and between the second hydraulic pump and the plurality of closed center valves, the reloader valve being responsive to a load signal on a load signal line coupled to the plurality of closed center valves.

DETAILED DESCRIPTION OF THE PREFERRED EMBODIMENTS

Figure 1:
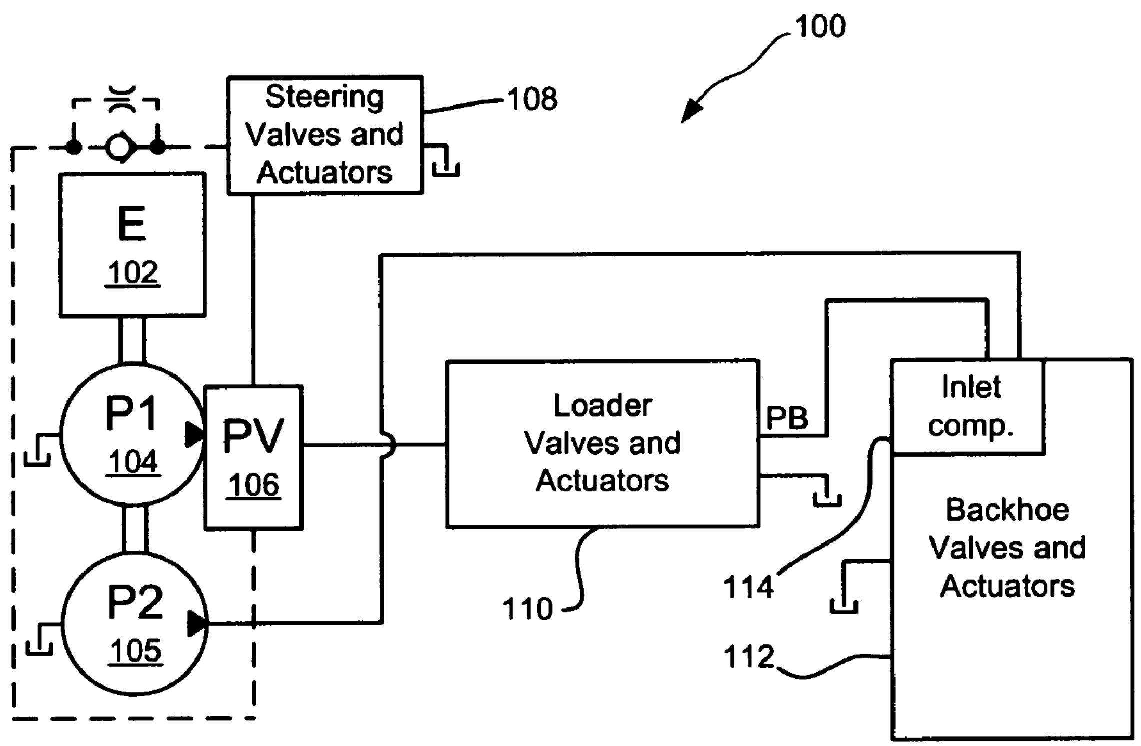
FIGURE 1 (prior art)
FIG. 1 shows a prior art work vehicle hydraulic system in which a priority valve supplies hydraulic fluid to open center control valves, then to an inlet compensator and bank of closed center control valves.

FIG. 1 shows a prior art hydraulic control system 100 for a work vehicle. In this example, the vehicle is a loader-backhoe. The circuit includes an engine 102 that drives hydraulic pumps 104 and 105.

Pumps 104 and 105 are constant displacement gear pumps. Pump 104 supplies hydraulic fluid to a priority valve 106. The priority valve splits the flow on a priority basis between the priority or primary steering circuit 108 on the one hand and the secondary circuit that includes open center valves 110, closed center valves 112 and inlet compensator 114.

Until a load is present on the steering circuit, the priority valve directs fluid to the open center loader valves 110 and then through the open center valves 110 to the closed center backhoe valves 112 through inlet compensator 114. Whenever a load appears on the steering circuit, however, priority valve 106 directs all necessary flow to the steering circuit. Pump 105 is always coupled to the closed center valves to provide them with fluid.

In the prior art hybrid designs such as the one shown in FIG. 1, providing a desired working pressure at the closed center valves requires a pressure ten to fifteen percent higher at the pump itself. The ten to fifteen percent higher pressure represents frictional losses in the hydraulic components—engine power that is converted to waste heat. By contrast, in a pure open center system without the inlet compensator, frictional losses would be reduced significantly to just a few percent of the working pressure.

Figure 2:
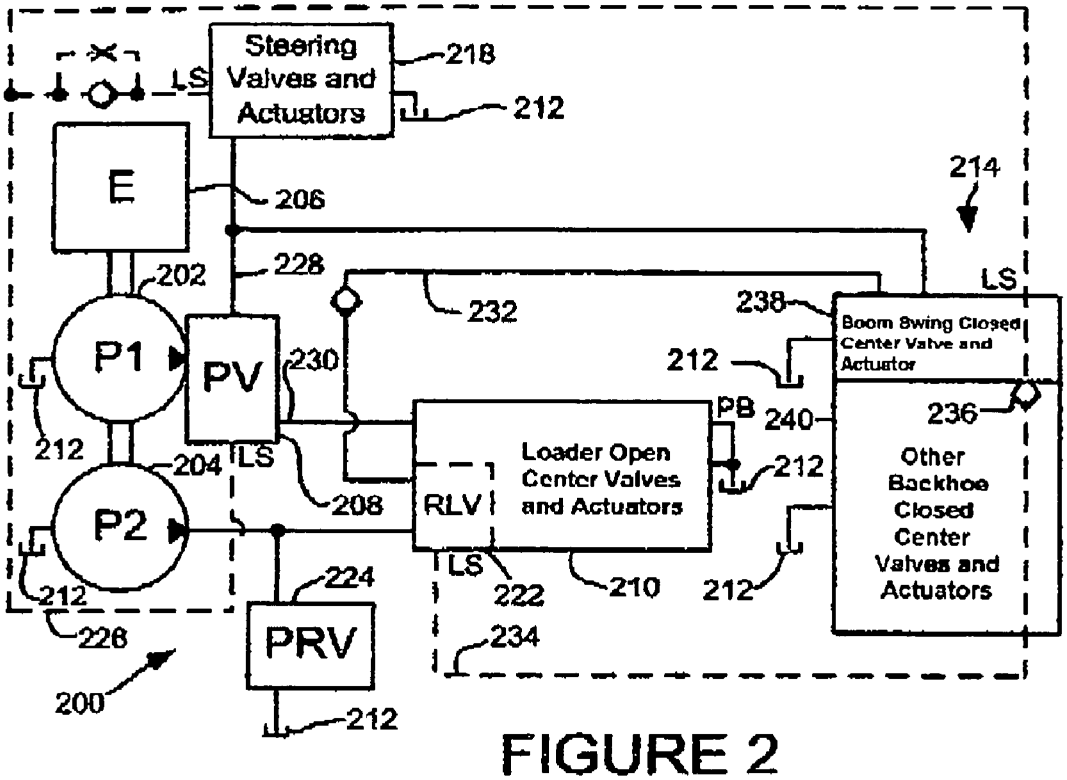
FIG. 2 illustrates a work vehicle hydraulic system in accordance with the present invention, in which both closed center and open center valves are served by a priority valve coupled to a first hydraulic pump. The system includes a second hydraulic pump under independent load control.
Figure 3:
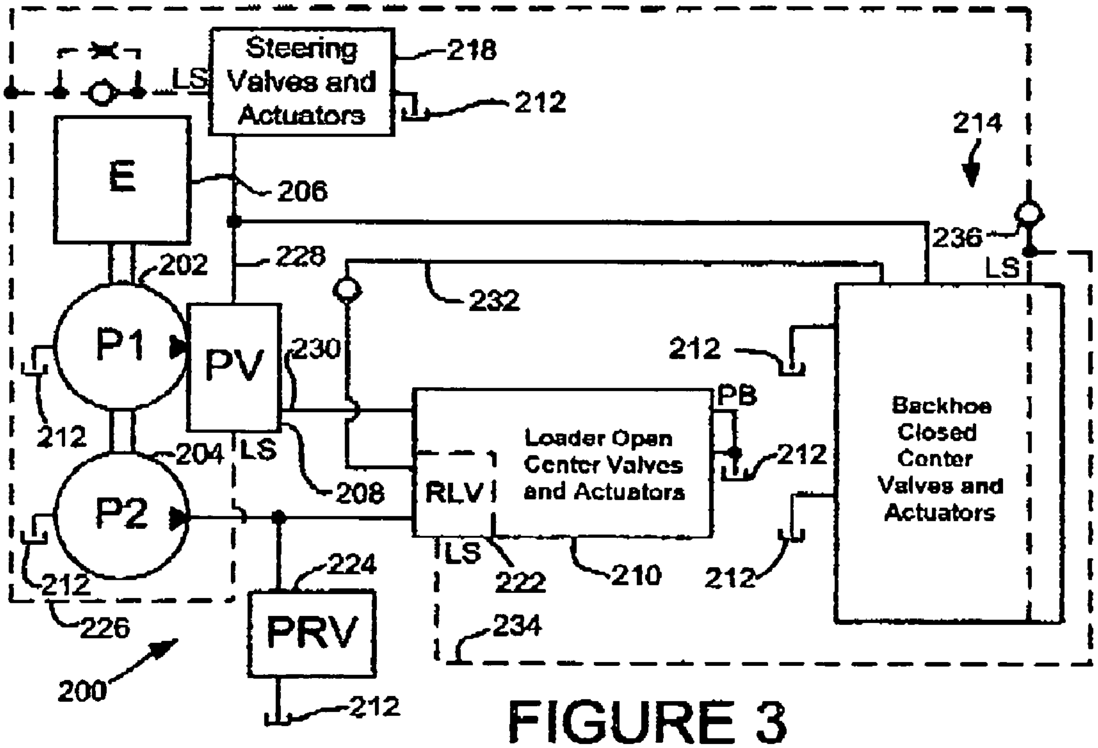
FIG. 3 illustrates a second work vehicle hydraulic system in accordance with the present invention, in which both closed center and open center valves are served by a priority valve coupled to a first hydraulic pump. This system also includes a second hydraulic pump under independent load control.

By coupling both the open center and the closed center valves to the priority valve in parallel, rather than in series (from the pump to the open center valves and then in series to the closed center valves, as shown in FIGS. 2 and 3 of the preferred embodiment) these frictional losses can be substantially reduced. The engine horsepower previously dissipated in producing these losses can again be made available to the operator of the vehicle for productive use.

FIGS. 2 and 3 disclose a hydraulic system 200 for a work vehicle (in this example a loader backhoe) having a first pump 202, a second pump 204, an engine 206, a priority valve 208, open center loader control valves and associated actuators 210 (which include a loader bucket control valve and actuator and a loader arm control valve and actuator), hydraulic return tank or reservoir 212, closed center backhoe control valves and actuators 214 (which include a boom swing control valve and actuator, a boom control valve and actuator, a dipper control valve and actuator, and a bucket control valve and actuator), steering valves and actuators 218, reloader valve 222, and pressure relief valve 224.

Engine 206 drives first and second pumps 202 and 204. These pumps are fixed displacement gear pumps. Pump 202 pumps fluid to priority valve 208, which distributes the fluid two different ways based upon the load signal (LS) it receives on load signal line 226; when priority valve 208 senses an increased load on signal line 226, it distributes more fluid to its primary (priority) port 228 and less fluid it to its secondary port 230, and vice versa. Pump 204 supplements the hydraulic fluid provided by pump 202 to closed center valves and actuators 214. Pump 204 provides hydraulic fluid to reloader valve 222. Reloader valve 222, in turn, supplies hydraulic fluid to closed center valves and actuators 214 on supply line 232. In FIG. 2 when the load signal on line 234 indicates a load on a first, lower subset 240 of closed center backhoe valves and actuators 214 (but not the second, upper subset 238 of them), and in FIG. 3 when the load signal on line 234 indicates a load on the entire group of closed center backhoe valves and actuators 214, then reloader valve 222 opens to conduct fluid to those valves and actuators 240 (FIG. 2) and 214 (FIG. 3). When the load signal on line 234 indicates no load or minimal load, reloader valve 222 is configured to stop supplying fluid to closed center valves and actuators 240 (FIG. 2), and 214 (FIG. 3) and the fluid flow from pump 204 is dumped back to tank 212 via pressure relief valve 224.

FIGS. 2 and 3 differ in one respect only: the way the load signal is applied to priority valve 208 and reloader valve 222. In both FIGS. 2 and 3, a check valve 236 is disposed between load signal line 226 and load signal line 234. Check valve 236 serves to isolate the two load signal lines 226, 234 in certain modes of operation, making them independent and making reloader valve 222 and priority valve 208 respond differently to changes in load.

In the arrangement of FIG. 2, check valve 236 is located between the two subsets 238, 240 of closed center backhoe valves and actuators 214. One subset 238 of the closed center boom swing control valve and actuators 214 is fluidly coupled to load signal line 226 which is above valve 236. Subset 238 includes the boom swing valve and actuators. The second subset 240 of the closed center boom swing control valve and actuators 214 is fluidly coupled to load signal line 234, which is below valve 236. Subset 240 includes the boom, the dipper, and the bucket control valves and actuators.

Whenever the load signal increases for the remaining backhoe valves and actuators 240, it is communicated both to load signal line 234 directly, and to load signal line 226 which extends from valves and actuators 214 across the top of FIGS. 2 and 3 to the steering valves and actuators 218 and then to priority valve 208 to which it is coupled. This connection to both of load signal lines 226 and 234 increases hydraulic fluid flow from pumps 202 and 204 to valves and actuators 240.

Whenever the load signal increases for the steering valves and actuators 218, or for closed center boom swing valve and actuators 238, the increased load signal only affects load signal line 226 and pump 202. The increased load signal does not affect load signal line 234, since check valve 236 prevents the signal from reaching load signal line 234.

As a result, changes in steering actuator loads or boom swing actuator loads are communicated (i.e. fed back) only to pump 202 through load signal line 226, which controls priority valve 208. Changes in boom cylinder, dipper cylinder and bucket cylinder loads are communicated (i.e. fed back) to both pump 202 (through the load signal line 226, which goes to priority valve 208, which in turn controls the flow direction of pump 202) and pump 204 (through load signal line 234, which goes to reloader valve 222, which controls the flow direction of flow from pump 204). Thus there are some loads connected to the closed center valves that pump 204 is independent of and not affected by, and there are some loads connected to closed center valves that pump 204 is responsive to. In one mode, pump 204 is independent of the load placed on pump 202 and of the operation of pump 202, and in another mode of operation, pump 204 operates in conjunction with pump 202 and is equally responsive to the loads placed on pump 202.

In the arrangement of FIG. 3, all the backhoe valves and actuators 214 are on one side of check valve 236.

In FIG. 3, whenever the load signal increases for any closed center backhoe valve and actuator 214 it is communicated both to load signal line 234 directly, and to load signal line 226 through check valve 236. This increases hydraulic fluid flow from pumps 202 and 204 to all the closed center valves and actuators 214.

Unlike the embodiment of FIG. 2, none of the closed center backhoe valves and actuators are isolated from pump 202 as the boom swing valve and actuators were in FIG. 2. Any load on any of the closed center backhoe valves and actuators will be communicated to pump 202 as well as to pump 204, since valve 236 does not block changes in backhoe loads from being applied to both load signal line 226 (to priority valve 208) and load signal line 234 (to reloader valve 222). Since all the closed center backhoe loads, including the boom swing valves and actuators, are coupled to load signal line 234 below check valve 236, they action both load signal lines 226 and 234, and therefore control both reloader valve 222 and priority valve 208.

Whenever the load signal on line 226 (FIG. 3) increases for the steering valves and actuators 218, as in FIG. 2, the increased load signal only affects load signal line 226 and pump 202. The increased signal does not affect load signal line 234, since check valve 236 prevents the signal from reaching load signal line 234. As a result, changes in steering cylinder loads are communicated only to pump 202 and not to pump 204.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

For example, the hydraulic actuators disclosed herein may be rotary devices such as hydraulic motors. They may also be linear devices such as hydraulic cylinders, both double-acting and single-acting.

We claim:

1. A hydraulic system for a work vehicle, comprising:

a first hydraulic pump configured to generate a first flow of hydraulic fluid;

a priority valve in fluid communication with the pump, said priority valve being configured to distribute the first flow to a primary outlet and to a secondary outlet:

a plurality of open center hydraulic valves coupled to the secondary outlet;

a hydraulic reservoir coupled to the plurality of open center hydraulic valves to receive the first flow after passing through the plurality of open center valves:

a plurality of closed center hydraulic valves coupled to the primary outlet;

a second hydraulic pump configured to generate a second flow of hydraulic fluid; and a reloader valve in fluid communication with the secondary pump, the reloader valve configured to distribute the second flow to the plurality of closed center valves, and further configured to prevent the secondary flow to the closed center valves when no demand signal is sensed;

wherein the first flow passes directly to the fluid reservoir from the plurality of open center valves.

2. The system of claim 1, wherein the first hydraulic pump is a fixed displacement gear pump, and further wherein the priority valve is responsive to a load on the plurality of closed center valves.

3. The system of claim 2, wherein the plurality of closed center valves includes at least one valve selected from the group comprising a boom swing cylinder control valve, a boom cylinder control valve, a dipper cylinder control valve, and a bucket cylinder control valve.

4. The system of claim 3, wherein die plurality of open center valves include at least one valve selected from the group comprising a loader bucket cylinder valve and a loader arm cylinder valve.

5. The system of claim 1, wherein no inlet compensator is in fluid communication with and disposed between the plurality of closed center hydraulic valves and the first pump.

6. The system of claim 1, the reloader valve being responsive to a load signal on a load signal line coupled to the plurality of closed center valves.

7. The system of claim 1, wherein the second flow is directed to the hydraulic reservoir when no demand signal is received by the reloader valve.

8. The system of claim 1, wherein the plurality of closed center valves are supplied by a flow of hydraulic fluid which does not pass through the plurality of open center valves.

* * * * *